(12) United States Patent
Whiteman (10) Patent No.: US 11,618,386 B2
(45) Date of Patent: Apr. 4, 2023

(54) TRUCK BUMPER DOCK EXTENSION FLIP STEP WALK RAMP

(71) Applicant: Morgan Truck Body, LLC, Morgantown, PA (US)

(72) Inventor: Paul L. Whiteman, Morgantown, PA (US)

(73) Assignee: Morgan Truck Body, LLC, Morgantown, PA (US)

(*) Notice: Subject to any disclaimer, the term of this patent is extended or adjusted under 35 U.S.C. 154(b) by 225 days.

(21) Appl. No.: 17/191,684

(22) Filed: Mar. 3, 2021

(65) Prior Publication Data

US 2021/0300248 A1    Sep. 30, 2021

Related U.S. Application Data

(60) Provisional application No. 62/984,671, filed on Mar. 3, 2020.

(51) Int. Cl.
| | |
|---|---|
| *B60R 3/02* | (2006.01) |
| *B60R 19/48* | (2006.01) |
| *B60P 1/43* | (2006.01) |

(52) U.S. Cl.
CPC ............... *B60R 3/02* (2013.01); *B60R 19/48* (2013.01); *B60P 1/431* (2013.01)

(58) Field of Classification Search
CPC ............ B60R 3/02; B60R 19/48; B60P 1/431
See application file for complete search history.

(56) References Cited

U.S. PATENT DOCUMENTS

| | | | |
|---|---|---|---|
| 2002/0003340 A1* | 1/2002 | Hallquist | B60R 3/02 280/163 |
| 2010/0242189 A1* | 9/2010 | Goin | B60P 1/431 14/72.5 |
| 2021/0206307 A1* | 7/2021 | Martinson | B60P 1/431 |
| 2022/0227298 A1* | 7/2022 | Jackson | B60R 3/007 |

* cited by examiner

*Primary Examiner* — Bryan A Evans
(74) *Attorney, Agent, or Firm* — John W. Montgomery (57) ABSTRACT

A truck bumper dock extension with a flip step configurable for use on a truck body to provide a functional bumper and a dock extension for loading and unloading at an elevated truck-dock and with the flip step configurable for use on the truck body for loading and unloading at an un-elevated surface, such as for home delivery. A walking ramp and stowing compartment is secured by the flip step for secure transport and removable access to a walking ramp.

3 Claims, 6 Drawing Sheets

TRUCK BUMPER DOCK EXTENSION FLIP STEP WALK RAMP

CROSS-REFERENCE TO RELATED APPLICATIONS

This application claims the benefit under 35 U S.C. § 119(e) to U.S. Provisional Patent Application Ser. No. 62/984,671, filed on Mar. 3, 2020. U.S. Provisional Patent Application Ser. No. 62/984,671, is incorporated herein by reference in its entirety, including all drawings and exhibits.

BACKGROUND OF INVENTION

Field of the Invention

The invention relates generally to a truck bumper dock extension for a truck or a truck body.

Background

Currently, there are a variety of truck bumper extensions to facilitate loading and unloading of a commercial truck at a truck loading dock. A load-carrying truck body typically has a floor surface that is elevated above the wheels and the frame of the truck on which the truck body is carried. The floor height is typically designed to correspond to within an acceptable range of standard loading dock heights or within a range of dock leveling capabilities for loading docks. A door into the load-carrying truck body is typically at the rear of the truck. To facilitated loading and unloading, a truck bumper extension may be attached to the truck body at the height of the cargo floor and can be backed up to the loading dock with only a small gap and a small height difference (as may be adjusted by a dock leveler). The addition of a truck bumper extension has been found to allow workers to stand on the top surface of the bumper extension and to move or position cargo adjacent to the loading dock for convenient and efficient loading and unloading. The truck bumper extension acts as a bridge from the dock to the truck body floor. There are also a variety of fixed and moveable access devices such as ladders, steps, and ramps that may be set on the ground and against the truck or truck bumper, or that may be fastened to a truck body or truck bumper. Such access devices are intended to permit a person to climb up from a lower surface, such as the ground or roadway, to the cargo floor of the truck body or to climb down from the floor to a lower surface, such as the ground or roadway.

SUMMARY OF INVENTION

In one or more embodiments, a truck bumper dock extension for a truck body, comprises a flip step that is attached to pivot from a closed position for transport and into an open position for providing stepped access from the ground to the floor of the truck body.

In one or more embodiments, a truck bumper dock extension for a truck body, may include a secured access carrying compartment for a walking ramp. The walking ramp compartment may be beneficially covered when the flip step is in the closed position for transport and accessible when the flip step is in an open position.

In one or more embodiments the truck body comprises a full dock extension walking surface when the flip step is pivoted closed in a dock loading configuration. The truck body a plurality of steps leading from the truck body floor to the ground when the flip step is pivoted to an opened configuration. This embodiment may be useful for loading and unloading away from a truck dock such as for "home delivery" and return package pickup.

Other aspects and advantages of the invention will be apparent from the following description and the appended claims.

BRIEF DESCRIPTION OF DRAWINGS

FIG. 7 is a schematic perspective view depiction of a side pivot boss that may be used according to one or more embodiments to form hinge connections for the flip step. A single pivot boss is shown and those skilled in are will understand that it may be usefully attached or integrally formed and paired with a second pivot boss aligned axially and a pivot axle there between.

DETAILED DESCRIPTION

It has been found by the inventor that ladders, steps, and walking ramps and other access devices can be beneficial for entering a truck from the ground level to arrange, load, or unload cargo. It has also been found that limitations on the available space the configuration of the truck body can make it difficult, awkward, and inconvenient to attach or carry ladders, steps, and walking ramps on the truck.

It has been found to be desirable to construct commercial truck access devices for secure and convenient out-of-the-way carrying, transport, and for easy access and deployment when delivery and loading to a surface lower than the floor of the truck body are required, for example, for a home delivery away from a loading dock.

Further, it has been found by the inventor that it is useful to centrally locate loading steps and walking ramps centrally behind the back door for convenient access to the truck body cargo compartment. The Usefulness of a central location applies whether the steps or walking ramp are fixed to the truck body or moveable from storage and transport on the truck and truck body to a position for use.

It has also been found by the inventor that forming steps, a ladder, or a walking ramp partially through a truck bumper extension can interfere with the continuity of the walking surface of the truck bumper extension when the truck bumper extension is used for dock loading.

It is further noted by the inventor that a substantially uninterrupted walking surface on a truck bumper extension is a useful feature for dock loading and the possible construction of a separate structure such as a moveable gap cover to maintain continuity of the truck extension walking surface, can require additional material and expense. It can also be inconvenient to remove and replace such a cover for the alternative uses for dock loading and for ground loading.

In one or more embodiments the truck bumper dock extension 20 provides a top walking surface 22). The dock loading extension 20 is attached or formed on the rear of the truck body 10 carried by a truck 8 and extending from the side frame 11 to the opposite side frame (not shown, typical with side frame 11) and extending rearward to an upper extension bumper 24 from the truck body 10. Advantageously, the walking surface is 22 substantially even with a transom 18 for a door opening 14 into the floor area 12 from the rear of the truck body 10 for loading and unloading cargo onto the truck body floor 12. The floor 12 of the truck body 10 may be at a predetermined or a determinable height above the ground level. In one embodiment the transom 18 may be formed by a top surface of an existing truck body bumper at the same or substantially the same height as the floor 12. The dock loading extension 22 supports an extension drop down bumper 28, shown attached to the upper extension bumper 24. A flip step 30 is pivotably attached in an opening 13 formed in the dock loading extension walking surface 22. When the flip step 30 is pivoted to an opened position it provides a plurality of steps 41, 42, 43 spaced apart between the truck body floor 12 to the ground. The open position may be referred to as a home delivery configuration. When the flip step 30 is pivoted to a closed position the opening 13 in the top walking surface 22 is effectively filled with face surface 36 of step 41 so that the combine walking surface 22 and the step face surface 36 are aligned and form a substantially "continuous" loading surface. The closed position may be referred to as a dock loading configuration.

Figure 1:
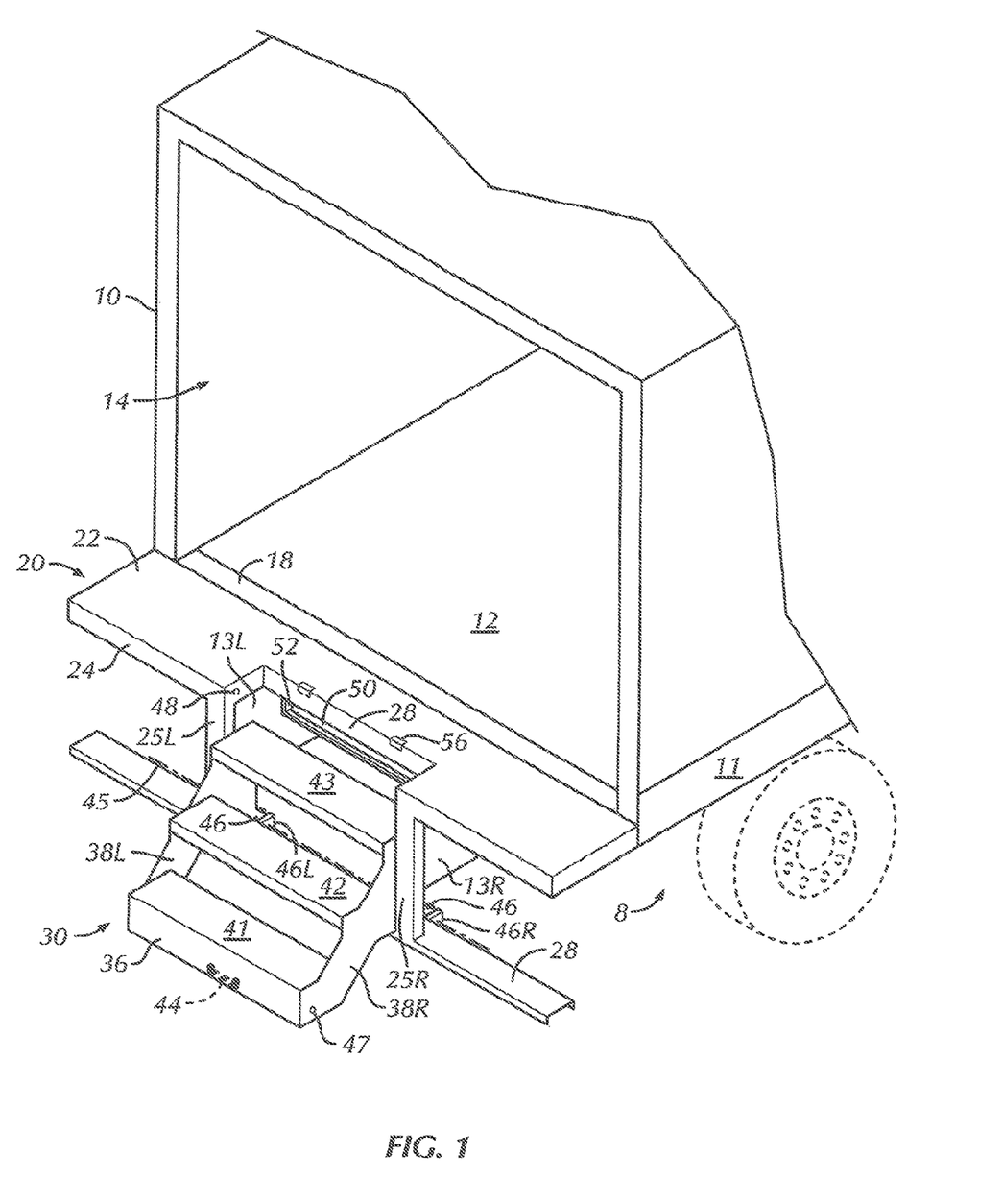
FIG. 1 is a schematic perspective view of an embodiment of a truck bumper dock extension flip step walking ramp construction on or attached to a truck body with the flip step pivoted open in a home delivery configuration and the walking ramp held in a storage or stowing compartment.

In one or more embodiments, as shown in FIG. 1, the truck bumper dock extension 20 with a flip step 30 is attached to a truck body 10 carried on a truck 8 (partially shown in FIG. 1). In the embodiment depicted, the flip step 30 is attached by a hinge 46 that may for example be formed by or one or more hinge bosses 46L and 46R (see also FIG. 2) with one or more rotation axles defining a rotation axis 45 therebetween and about which axis 45 the flip step 30 may be pivoted. Advantageously, the flip step 30 may be constructed of a lightweight durable material, such as aluminum. The material may be selected and treated for corrosion resistance and the walking surfaces may be provided with non-slip texture or features. A latch mechanism such as coupling engaging latches 47 and 48 on either or both sides 13L and 13R of the flip step 20 and opening 13 usefully lock the flip step 30 in the closed position for transport and use of the combined dock loading surface 22 and 36. A grip 44 may be provided attached to the flip step 30 to facilitate manual movement of the flip step. The grip 44 may also slidably actuate the latching mechanisms 47L, 48L and 47R, 48R into a locked position. Upon release of the latching mechanisms 47 and 48, the flip step 30 can pivot at hinge 46 about an axis 45 between an open position 100, as shown in FIG. 1 to a closed position 200, as shown more fully with also reference also to FIGS. 2 and 3. In the open position, the flip step 30 can be used for access to the door opening 14, threshold 18, and cargo floor area 12 of the truck body 10. The truck body 10 is attached to and transported on a truck 8 (partially shown). The floor of the truck body 10 is at a predetermined height above the ground level.

Additionally, it has been found that fixed or built-in steps or ladders can hinder or interfere with the ability to conveniently stow, carry, and easily retrieve a walking ramp for use in situations where hand-dolly loading or unloading may be beneficial due to the size or configuration of the cargo.

In one or more embodiments of a truck bumper dock extension 20 for a truck body 10, the flip step 30 covers a walking ramp 50 and stowing compartment 52 when the flip step 30 is in the closed position for transport. Walking ramp connectors 56 may be provided in the truck bumper dock extension 20 to support one end of the walking ramp when in use.

In one or more embodiments the truck body comprises a full or substantially continuous dock extension walking surface 22 and 36 when the flip step 30 is pivoted closed in a dock loading configuration, and comprising a plurality of steps 41, 42, and 43 from the truck body floor 12 to the ground when the flip step 30 is pivoted open in a home delivery configuration.

Figure 2:
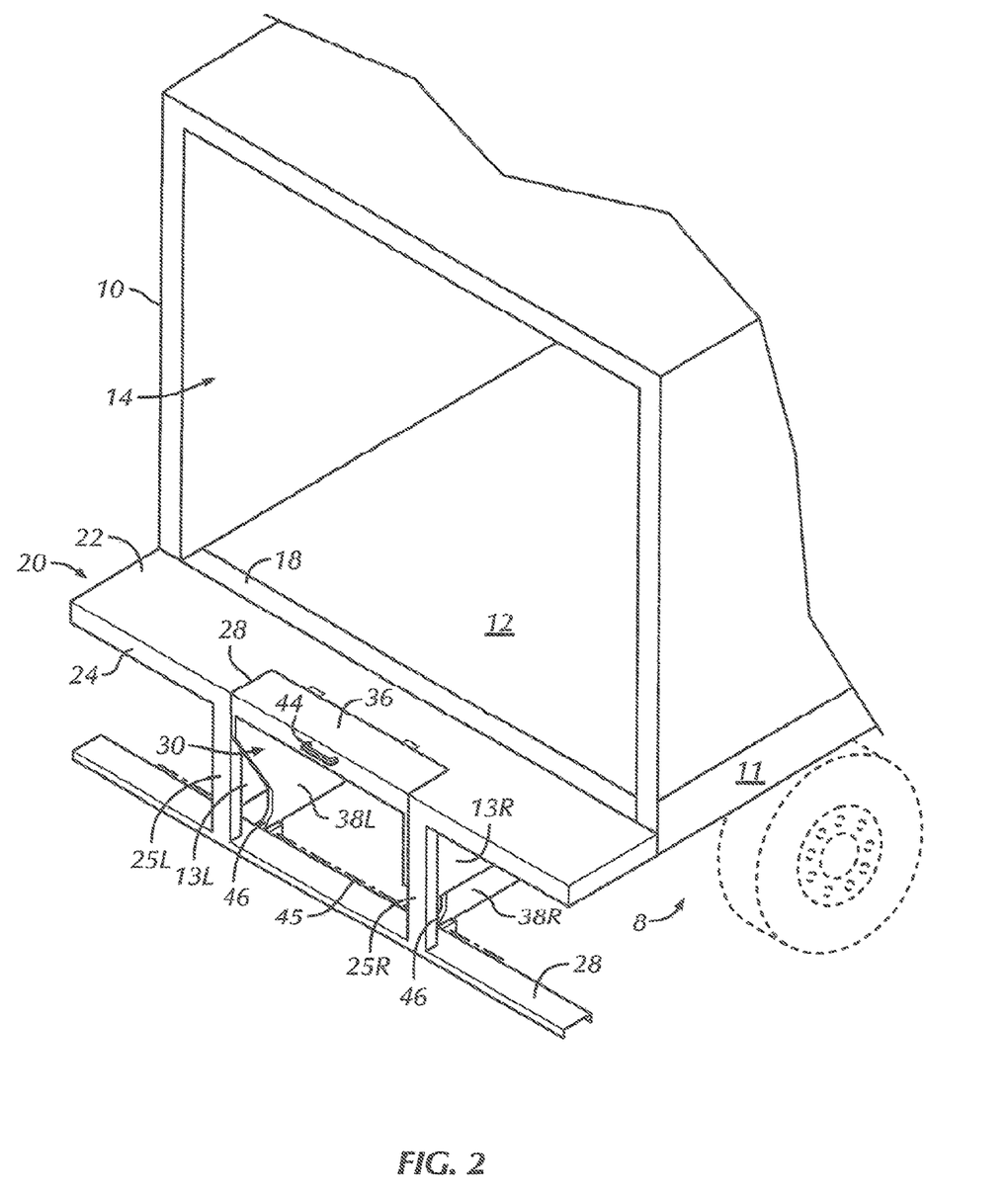
FIG. 2 is a schematic perspective view of an embodiment of a truck bumper dock extension flip step walking ramp attached to a truck body as in FIG. 1, with the flip step pivoted closed in a "transport and dock loading" configuration and the walking ramp held in the stowing compartment.

FIG. 1 shows a perspective view of an embodiment of a truck bumper dock extension 20, flip step 30, and walking ramp 50 constructed and attached to a truck body 10. According to one or more embodiments, the flip step 30 is pivotable about a pivot-axis 45. The flip step 30 is pivotable between an opened, step-down use configuration (as shown in FIG. 1) and a closed, transport configuration (as shown in FIG. 2). The flip step 30 comprises a bottom step 41 and a top step 43 and may include one or more intermediate steps 42 depending upon the height above the ground of the floor 12 of truck body 10 carried on truck 8. In operation the bottom step 41 is rotated with the flip step 30 rearward and downward relative to the truck bumper dock extension 20 and truck body 10, to a position downward from the truck body 10 and the truck bumper extension 20. In one embodiment the flip step 30 also comprises an intermediate step 42. Each of the steps 41, 42, and 43 are parallel to the other steps and when the flip step 30 is pivoted to the open downward position, each step is spaced from the other at a vertical distance and a fore-and-aft distance approximating normal stair-step distances upward and laterally for human usage. The top step 43 of the flip step 30 is positioned at a distance approximately equal to normal vertical step distance downward from the top surface 22 of a truck bumper extension 20. The intermediate step 42 is similarly positioned at distances approximately equal to normal step distances down and rearward from the top surface of the top step 43, and up and forward from the bottom step 41. When the bottom step surface 41 is in the open position, it is positioned at a vertical distance from the ground surface approximately the same as a normal stepping height.

Figure 3:
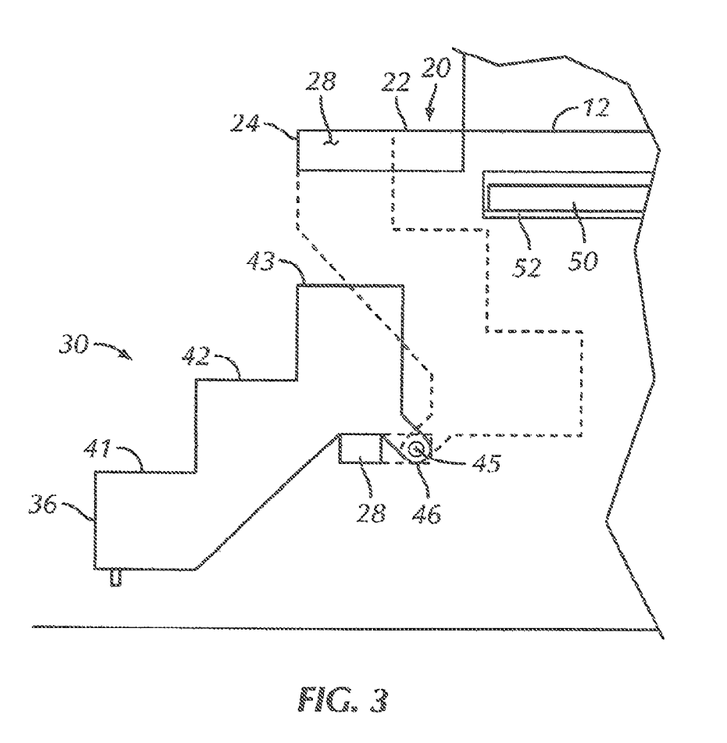
FIG. 3 is a schematic side section view vertically through an embodiment of a truck bumper dock extension flip step walking ramp construction on a truck body showing the flip step pivoted closed and in a configuration for transport and dock loading (in dashed lines) and showing the flip step pivoted open in a home delivery configuration (in solid lines) and with the walking ramp held in the storage compartment.

In one or more embodiments, as shown in FIGS. 1, 2, and 3, a truck bumper dock extension 20 with a flip step 30 is attached to a truck body 10 carried on a truck 8 (partially shown in FIG. 1). In the embodiment depicted, the flip step 30 is attached by a hinge 46. The flip step 30 can pivot at hinge 46, thereby rotating about an axis 45 between an open position, to a closed position. The rotation and closed position are shown more fully with reference also to FIGS. 2 and 3. The pivot axis 45 is substantially horizontal to the ground and parallel to the top walking surface 22 of truck bumper extension 20. The flip step 30 comprises a plurality of steps 41, 42, 43 that can be used as a set of stairs for climbing access between a lower surface such as the ground and the top surface 22 of the truck bumper extension 20. The flip step 30 and cut-out 13 in the dock extension are beneficially centrally located behind the door opening 14 and the cargo floor area 12 of the truck body 10.

In one or more embodiments, a truck bumper dock extension for a truck body, comprises a flip step 30 that is attached to pivot from a closed position for transport and into an open position 100 for providing stepped access from the ground to the floor 12 of the truck body 10 and a walking ramp carrying compartment 52 that is covered when the flip step is in the closed position 200 for transport.

FIG. 3 shows a schematic side view of an embodiment of a truck bumper dock extension 20, flip step 30, and walking ramp 50 constructed and attached to a truck body 10 according to one or more embodiments. The flip step 30 is schematically shown pivoted from a closed position (shown in solid lines) to an opened configuration (shown in dashed lines lines). The walking ramp 50 is held in a storage compartment 52 extending forward of the flip step 30 and under the bottom of the floor 12. The flip step 30 is pivotably attached at a hinge 46 and configured so that the largest radius path R, of any part of the flip step 30, does not contact the ramp stowing compartment 52, the walking ramp 50, or other parts of the structure that might otherwise hinder complete rotation when rotating between the opened position 100 and closed position 200. In one or more embodiments the complete rotation between the opened and closed positions is about 90 degrees. When the flip step 30 is in the open position, the top step 43 is lower than the storage compartment 52 so that the walking ramp 50 may be released to slide out of the compartment. In the closed position, a face 36 of the bottom step 41 of the flip step 30 is in alignment with the top surface 22 of the dock bumper extension 20 behind the walking ramp 50. When the flip step 30 is in the closed position 200 the walking ramp 50 will not slide out of stowing compartment 52.

In one or more embodiments, a truck bumper dock extension for a truck body 20, comprises a flip step 30 that is attached to pivot from the closed position 200 for transport and into the open position 100 for providing stepped access from the ground to the floor 52 of the truck body and a walking ramp stowing compartment that is covered when the flip is in the closed position 200 for transport.

The flip step 30 can also be pivoted up and into a transport and loading dock use configuration as shown in FIG. 2.

A walking ramp 50 is slidably held in a storage or stowing compartment 52 formed forward of the flip step 30 and extending for stowed transport under the floor 12 of the truck body 10.

FIG. 2 shows a schematic side section view vertically through an embodiment of a truck bumper dock extension 20 attached to a truck body 10 showing a flip step 30 pivoted closed and in a transport and dock loading configuration in solid lines and showing the flip step pivoted open in a home delivery configuration and the walking ramp held in a storage compartment.

FIG. 3 shows a schematic side section view vertically through an embodiment of a truck bumper dock extension attached to a truck body showing the flip step pivoted closed and in a configuration for transport and dock loading shown in solid lines and showing the flip step pivoted open and in a home delivery configuration and the walking ramp held in a storage compartment shown in dashed lines.

Figure 4:
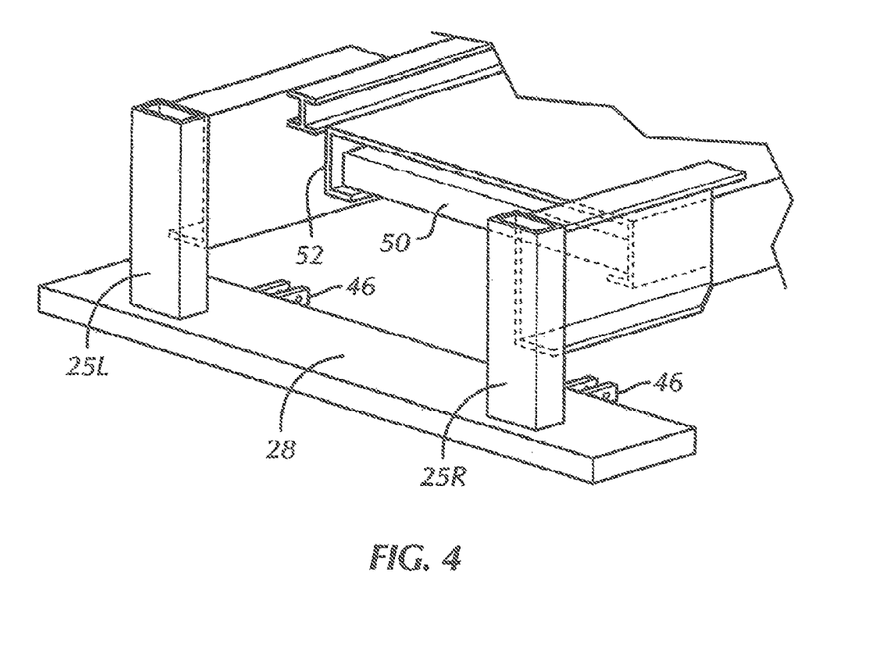
FIG. 4 is a partial cutaway perspective view drawing showing aspects of the construction of a drop step and of the support structure for constructing and attaching the truck bumper extension, flip step, walking ramp, and stowing compartment according to one or more embodiments of the invention.

FIG. 4 shows a partial cutaway section view drawing with example dimensions showing aspects of the construction of the attachment and support structure for the truck bumper extension, flip step, and walking ramp storage compartment according to one or more embodiments of the invention. The specific dimensions are examples only and provide possible relative size and spatial relationships and are not intended to define or limit the invention to the specific dimensions and spatial configurations depicted.

Figure 5:
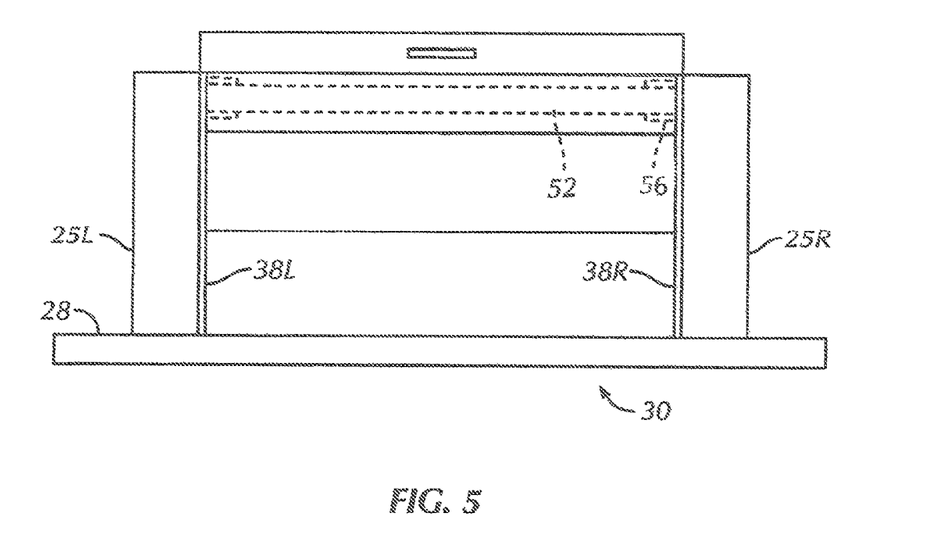
FIG. 5 is a partial back end view construction drawing showing the support structure construction for drop step, truck bumper extension with end dimensions for accommodating a flip step and a stowing compartment for holding a walking ramp.

FIG. 5 shows a schematic partial end view depiction of a drop step and support structure for the truck dock extension, flip step side plates, and walking ramp and holding compartment according to one or more embodiments of the present invention. The specific dimensions are examples only and provide possible relative size and spatial relationships and are not intended to define or limit the invention to the specific dimensions and spatial configurations depicted.

Figure 6:
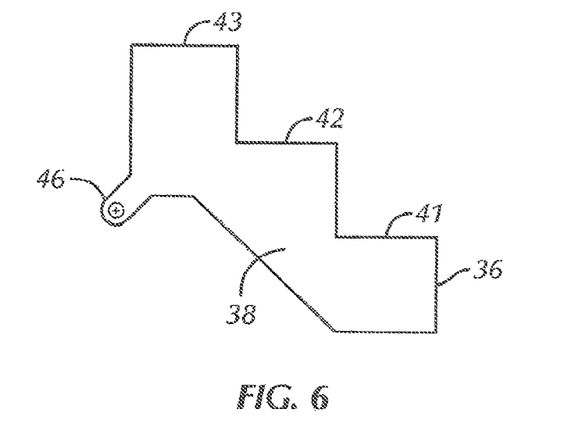
FIG. 6 is a schematic side view depiction of a side support plate of the flip step with a hinge connection formed thereon. A single side support plate is shown and those skilled in are will understand that the steps may be usefully attached or integrally formed between a pair of side support plates for construction of the flip step.

FIG. 6 shows a schematic depiction of a side plate 38 of the flip step 30 with a hinge connection 46 according to one or more embodiments of the present invention.

Figure 7:
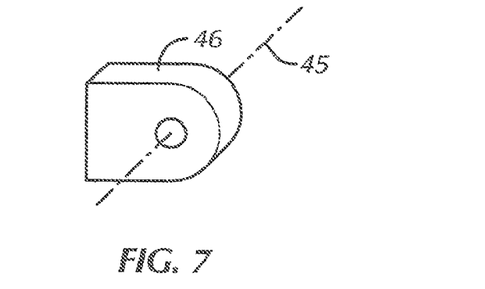

FIG. 7 shows a schematic depiction of a hinge boss 46 according to one or more embodiments of the present invention. The specific dimensions are examples only and provide possible relative size and spatial relationships and are not intended to define or limit the invention to the specific dimensions and spatial configurations depicted. In one embodiment a plurality of bosses 46 may form the hinge connection 46, comprising a pair of bosses 46 attached on the flip step 30 and a pair of bosses 46 attached on the truck bumper extension 20, wherein the bosses are aligned so that a holes therethrough are rotatably engaged with one or more axles 40.

Figure 8:
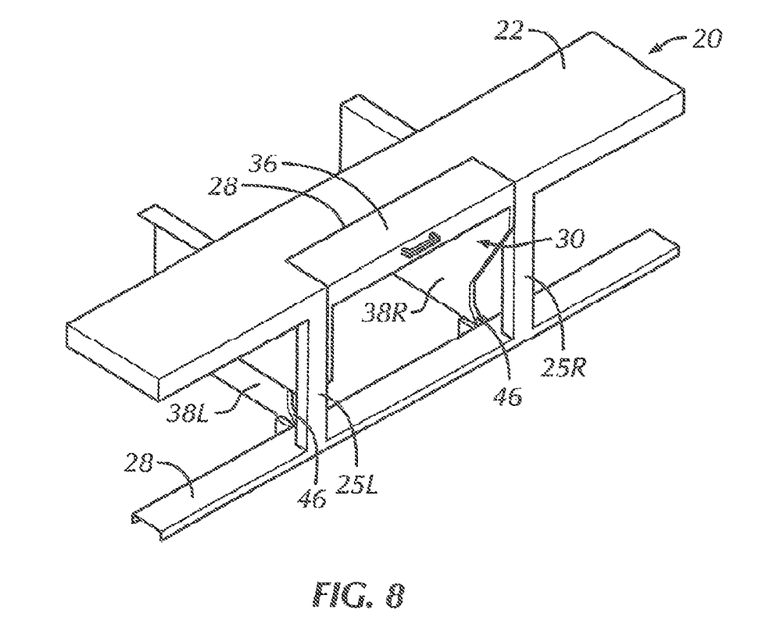
FIG. 8 is a schematic perspective view of an embodiment of a truck bumper dock extension and flip step for attaching to a truck body (walking ramp and truck body not shown), with the flip step pivoted closed in a "transport and dock loading" configuration.

FIG. 8 shows a perspective view of the truck bumper dock extension 20, flip step 30 in a closed position and constructed for attachment to the truck body 10 according to one or more embodiments of the present invention.

Figure 9:
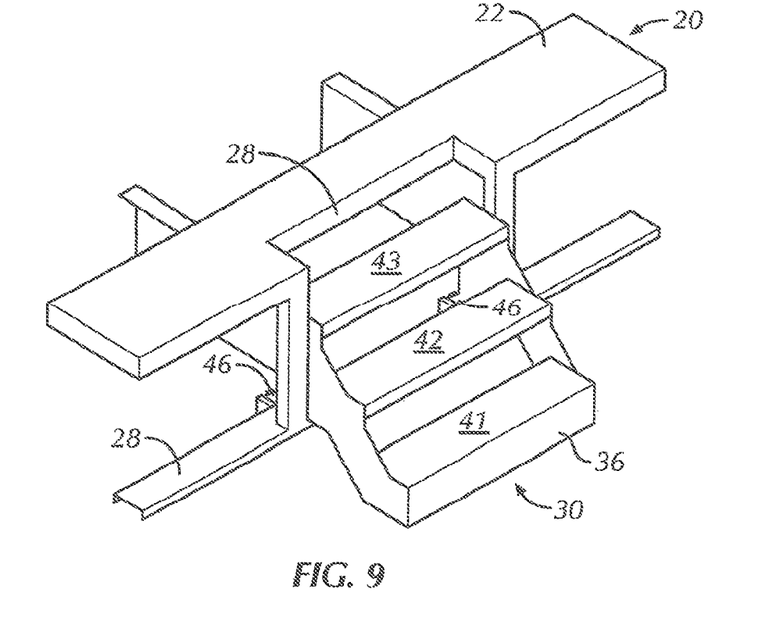
FIG. 9 is a schematic perspective view of an embodiment of a truck bumper dock extension and flip step for attachment to a truck body (walking ramp and truck body not shown) with the flip step pivoted open in a home delivery configuration.

FIG. 9 shows a perspective view of the truck bumper dock extension 20 with the flip step 30 in an open position and constructed for attachment to the truck body 10 according to one or more embodiments of the present invention.

Other aspects and advantages of the invention will be apparent from the following description and the appended claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A truck bumper dock extension comprising:
   a) a bumper extension having a top walking surface, dock bumper surface, a cut-out portion of the top walking surface, and a drop step connected by down frames on either side of the cut-out portion of the top walking surface; and
   b) a flip step having side plates with a plurality of steps including a top step with a top-step surface and a bottom step having a bottom-step surface and a right-angled face surface, wherein the flip step is connected by a hinge connection to the drop step at a position between the down frames in the area of the cut-out portion of the top walking surface such that the flip step is pivotable about 90 degrees between an open position and a closed position, and in the open position the plurality of steps provide stairs from the ground to the top walking surface and the bottom step spaced above and adjacent to the ground, and in the closed position the right-angled face of the bottom step is inserted into the area of the cut-out portion of the top walking surface parallel to and aligned level with the top walking surface thereby providing step climbing access to the truck bumper dock extension in the open position and forming a combined substantially continuous to walking surface along the dock extension in the closed position.

2. The truck bumper dock extension of claim 1, comprising a ramp holding compartment under and parallel to the top walking surface of the bumper extension for slidably holding a walking ramp, wherein the walking ramp is retrievable from between the bumper extension and the top step of the flip step when the flip step is in open position.

3. A truck bumper dock extension for use on a truck body attached on a truck frame, the truck bumper dock extension comprising:
   a) a bumper extension attached to the back of a truck body having a top walking surface substantially level with the truck body and extending rearward of the truck body at least a distance for permitting stepping on the top walking surface;
   b) a flip step cut-out centrally located in the bumper extension having a predetermined width;
   c) a drop step bumper rigidly affixed below the extension at a distance less than the minimum height of the truck body when attached for operation on a truck frame;
   d) A flip step assembly pivotably connected to the drop step bumper and positioned for pivotal movement from a stored position and filling the flip step cut-out and a stepping position exposing a plurality of step surfaces at uniform stepping distances below the bumper extension, thereby providing stair-step access to the top walking surface; and
   e) a stowing compartment for removably holding and transporting a walking ramp, wherein the walking ramp is slidably removable from the stowing compartment and configured for support from the cut-out area of the bumper extension and extending at a shallow walking ramp angle to the ground, thereby providing ramp access to the top walking surface.

* * * * *